United States Patent [19]

Gotoh

[11] Patent Number: 4,964,031
[45] Date of Patent: Oct. 16, 1990

[54] METHOD OF STARTING A GROUP OF LOOMS

[75] Inventor: Miyuki Gotoh, Tokyo, Japan

[73] Assignee: Nissan Motor Co., Ltd., Yokohama, Japan

[21] Appl. No.: 254,900

[22] Filed: Oct. 7, 1988

[30] Foreign Application Priority Data

Oct. 9, 1987 [JP] Japan .................................. 62-255563

[51] Int. Cl.$^5$ ........................ G05B 19/40; G06F 15/46
[52] U.S. Cl. .................................... 364/138; 364/470; 364/133; 139/1 R
[58] Field of Search ............... 364/138, 470, 900, 139, 364/133; 242/47.01, 47.06; 139/435, 1 R

[56] References Cited

U.S. PATENT DOCUMENTS

| 4,031,718 | 6/1977 | Luth | 364/470 |
| 4,530,381 | 7/1985 | Takegawa | 242/47.01 |
| 4,736,324 | 4/1988 | Sainen et al. | 364/138 |
| 4,835,699 | 5/1989 | Mallard | 364/470 |

Primary Examiner—Jerry Smith
Assistant Examiner—Paul Gordon
Attorney, Agent, or Firm—Foley & Lardner, Schwartz, Jeffery, Schwaab, Mack, Blumenthal & Evans

[57] ABSTRACT

A method for starting a group of looms each of which has a control circuit in electrical connection with a central control device. The method includes the steps of outputting operation command signals from the central control device respectively to the control circuits of the looms in a predetermined order, and successively operating each loom in response to the operation command signal upon completing preparation for starting the loom, thereby automatically starting the looms in the predetermined order without requiring operator action for each loom.

7 Claims, 6 Drawing Sheets

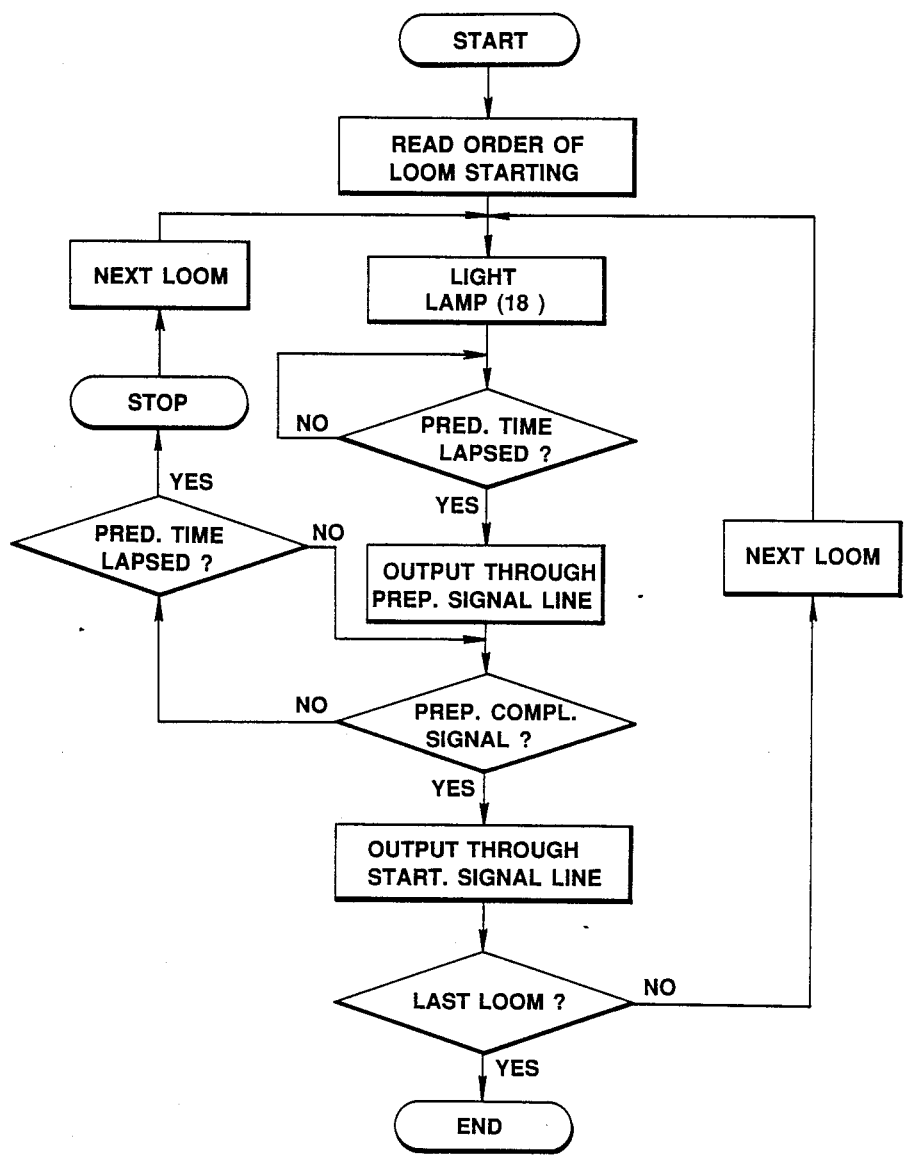

METHOD OF STARTING A GROUP OF LOOMS

BACKGROUND OF THE INVENTION

1. Field of the Invention

The present invention relates to a method of starting a group of looms automatically within a relatively short period of time without operating a starting switch provided in each loom and, and more particularly to a starting method for a group of looms each having a control circuit which is controlled in response to a command signal from a central control device.

2. Description of the Invention

Hitherto starting of looms in a factory has been carried out by an operator who operates a starting switch provided in each loom, for example, after a holiday. However, if an operator covers fifty looms, fifty minutes are required for starting fifty looms if one minute is necessary for starting each loom. Accordingly, the lastly started loom is allowed to remain stopped for about fifty minutes though there is no functional trouble in the loom. This is disadvantageous from the view point of improving productivity.

SUMMARY OF THE INVENTION

An object of the present invention is to provide an improved method of starting a group of looms smoothly and within a short period of time without operating a starting switch provided in each loom.

According to the present invention, a method of starting a group of looms is as follows: Operation command signals are output from a central control device out of the looms respectively to the control circuits of the looms in a predetermined order. Then, each loom is operated in response to the operation command signal upon completing preparation for starting the loom.

Accordingly, the main motors of respective looms can be automatically operated successively in a predetermined order without an operator's starting operation for each loom. This does not require a relatively long time before the lastly started loom is operated thereby promoting labor saving and greatly improving productivity.

BRIEF DESCRIPTION OF THE DRAWINGS

In the drawings, the same reference numerals designate the corresponding elements throughout all the figures, in which:

FIG. 6 is a flowchart showing the operation of the central control device of the loom starting system of FIG. 5.

DETAILED DESCRIPTION OF THE INVENTION

Figure 1:
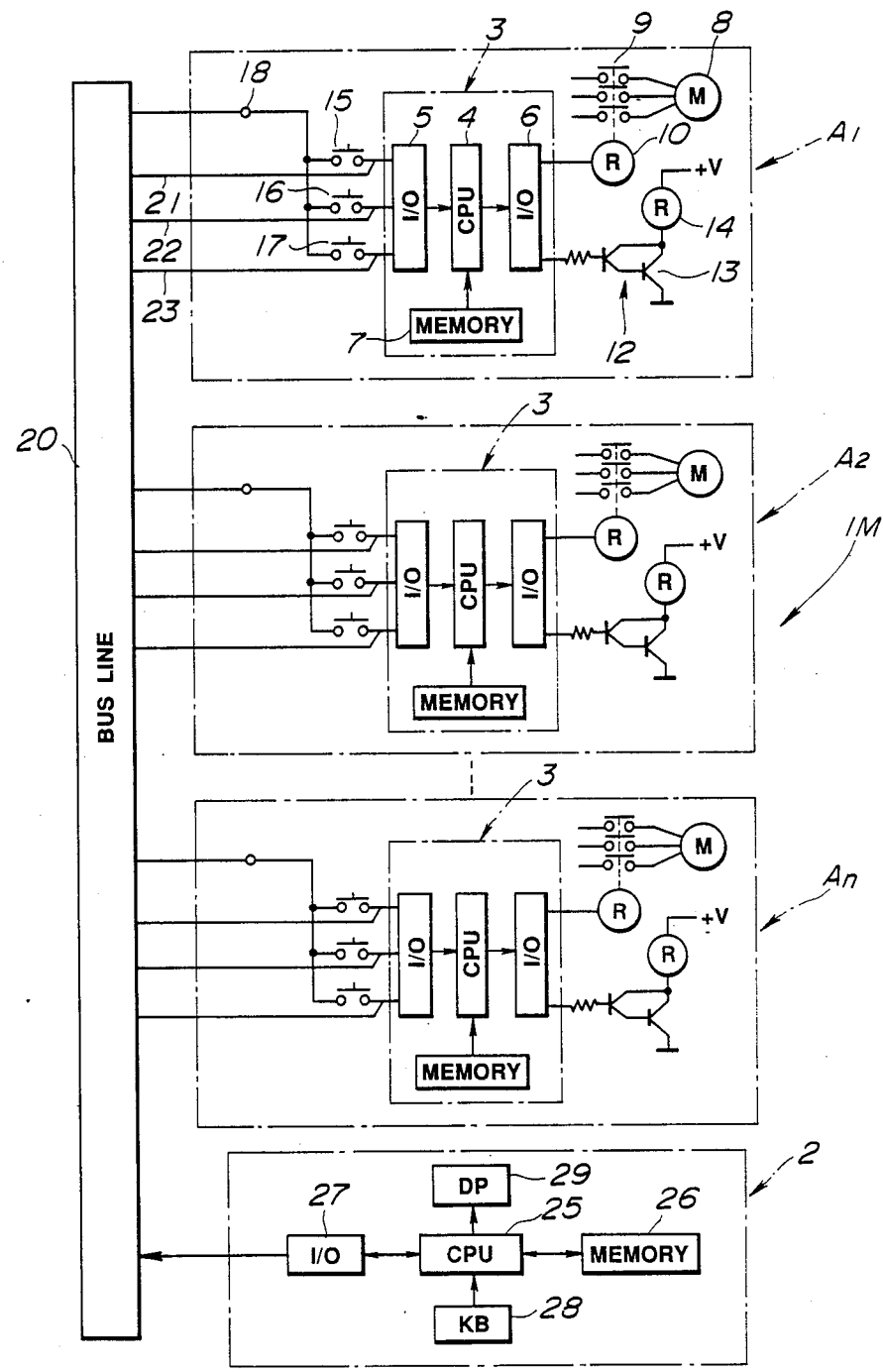
FIG. 1 is a circuit diagram of a first embodiment of a loom starting system by which a loom starting method according to the present invention is accomplished.
Figure 2:
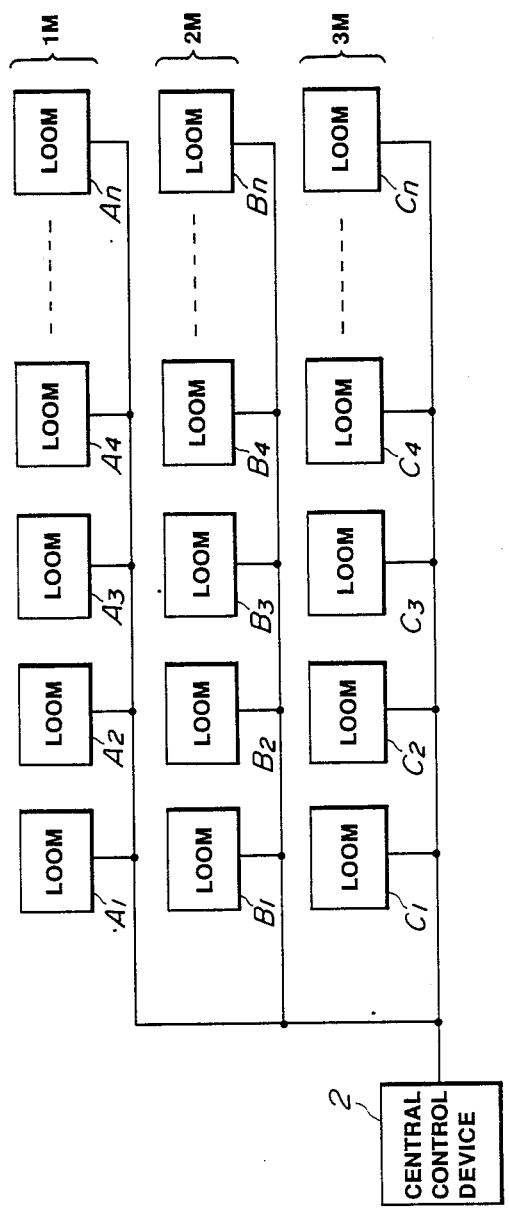
FIG. 2 is a schematic illustration of relationship between a central control device of the loom starting system and a plurality of looms.

Referring now to FIGS. 1 and 2, a first embodiment of a loom starting system and method according to the present invention is illustrated together with a plurality of looms $A_1$ to $A_n$, $B_1$ to $B_n$ and $C_1$ to $C_n$. The looms $A_1$ to $A_n$ constitute a first group of looms 1M, the looms $B_1$ to $B_n$ a second group of looms 2M, and the looms $C_1$ to $C_n$ a third group of looms 3M. A central control device 2 is electrically connected to a control circuit 3 (in FIG. 1) of each loom in such a manner as to establish electrical communication therebetween.

As shown in FIG. 1 in which the relationship between the central control device 2 and the first group of looms $A_1$ to $A_n$ is shown in detail, each loom is provided with its own control circuit 3 which, for example, includes a CPU 4. Input and output (I/O) interfaces 5, 6 are electrically connected to the CPU 4 to which a memory 7 is also electrically connected. Each loom is further provided with a main motor 8 for driving the loom and connectable through a contactor 9 with an electric source. The contactor 9 is electrically connected to a relay 10 which is in turn electrically connected to the I/O interface 6, so that the contactor 9 is opened or closed in response to output of the I/O interface 6 in order to cause the main motor 8 to be electrically disconnected from or connected with the electric source. Each loom is further provided with a loom stopping circuit 12 electrically connected to the I/O interface 6. The loom stopping circuit 12 is adapted to be switched ON in response to output of the output interface 6 thereby to operate a relay 14. When the relay 14 is operated, a brake (not shown) for stopping loom operation is operated. More specifically, the brake is adapted to brake a pulley (not shown) connected to a pulley (not shown) mounted on the rotatable shaft of the main motor, though not shown. In this instance, the relay 10 is arranged to open the contactor 9 thereby to stop electric current supply to the main motor 8.

Each loom is equipped with a preparation switch 15, a loom starting switch 16 and a loom stopping switch 17 which are electrically connected through a bus line 20 with the central control device 2. A warning lamp 18 of each loom is also electrically connected through the bus line 20 with the central control device 2. It will be understood that all the looms shown in FIG. 1 have the same electrical arrangement as in the looms $A_1$ to $A_n$ of the first group $A_1$ and therefore explanation of electrical arrangement of other looms is not repeated for the purpose of simplicity of illustration.

Figure 3:
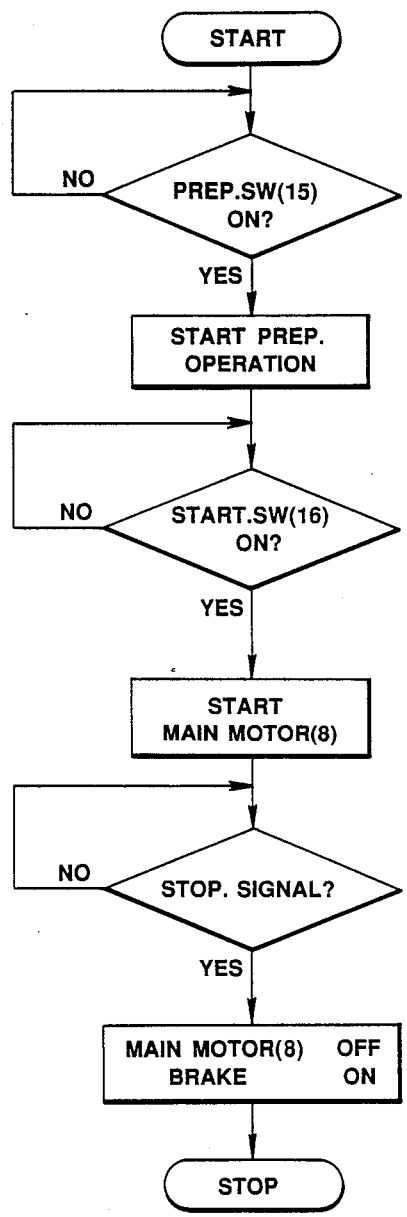
FIG. 3 is a flowchart showing the operation of a control circuit for each loom.

Each loom is controlled by the control circuit 3 in accordance with a flowchart of FIG. 3. First when the preparation switch 15 is switched ON, preparation operation is carried out. The preparation operation includes all arrangements for accomplishing normal operation of the loom, for example, preheating operation of heat cutters and the like in case of a loom using heat cutters for cutting yarns with heat. Subsequently, when the starting switch 16 is switched ON, the relay 10 is operated to start the main motor 8 so that the loom is brought into its operating condition. During operation of the loom, a judgement is made as to whether a stopping signal is output from the I/O interface 6 or not. When the stopping signal is output, the relay 10 is operated to open the contactor 10 while the relay 14 is operated to operate the brake for the loom, thus stopping the main motor 8. It will be understood that the stopping switch 16 is adapted to operate the relay 10 so as to open the contactor 9 and operate the brake thereby to stop the main motor 8.

As shown in FIG. 1, a preparation signal line 21 is connected parallel with the preparation switch 15. A starting signal line 22 is connected parallel with the loom starting switch 16. Additionally, a stopping signal line 23 is connected parallel with the loom stopping switch 17. The lines 21, 22, 23 are connected to the bus line 20. In this connection, a preparation signal for the above-mentioned preparation operation is transmitted from the central control device 2 through the preparation line 21 to the I/O interface of the control circuit 3 of each loom, upon which the preparation operation for the loom is carried out. A starting signal for starting the loom is transmitted from the central control device 2 through the starting signal line 22 to the interface 5 of the control circuit 3, upon which the relay 10 is operated to start the main motor 8. A stopping signal for stopping the loom is transmitted from the central control device 2 through the stopping signal line 23 to the interface 5 of the control circuit 3, upon which the relay 10 is operated to open the contactor 9 while the relay 14 is operated to operate the brake thus to stop the main motor 8. It will be understood that the loom is controlled in response to the operation of the switches 15, 16 and 17 or controlled by the central control device 2 in response to the signals transmitted from central control device 2 through the lines 21, 22, 23.

The central control device 2 includes a CPU 25 to which a memory 26, an input and output interface 27, a keyboard 28 and a display 29 are electrically connected. Electrical communication is established between the central control device 2 and the control circuit 3 of each loom thereby permitting information interchange therebetween. All the looms of the first, second and third groups 1M, 2M, 3M are controlled by the central control device 2 in accordance with a flowchart of FIG. 4. That is, each loom group 1M, 2M, 3M is controlled in response to command signals from the central control device 2 as follows:

For example, in case of the first group of looms 1M as shown in FIG. 1, first the order of starting the looms is read from the memory 26 of the central control device 2, and then the lamp 18 in the loom $A_1$ is lit or switched ON thereby informing to operators or the like the fact that the loom is automatically operated from now on. It will be understood that a buzzer or other indicators may be used in place of the lamp 18.

Next upon lapse of a predetermined time, the preparation signal is transmitted from the central control device 2 through the preparation signal line 21 in place of closing action of the preparation switch 15, upon which the control circuit 3 is brought into its operating state. Subsequently upon lapse of a predetrmined time, the starting signal is transmitted from the central control device 2 through the starting signal line 22 to the control circuit 3 thereby to start the main motor 8. Then, a judgement is made as to whether the last loom has been reached. If the order does not corresponds to the last loom $A_n$, the above-mentioned flow or procedure from the step of lighting the lamp 18 is repeated for the next loom $A_2$. Otherwise, if the order corresponds to the last loom $A_n$, this flow or procedure is terminated.

Figure 4:
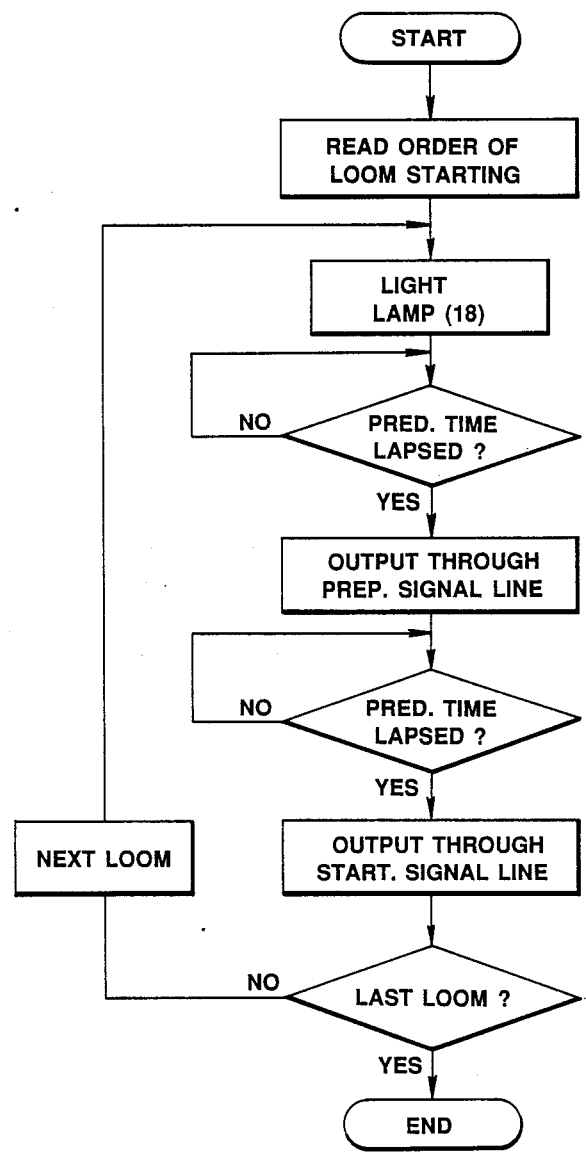
FIG. 4 is a flowchart showing the operation of the central control device of FIG. 1.

It will be understood that the lamp 18 or similar warning means may be used for each loom group 1M, 2M, 3M. The above-mentioned flow or procedure of FIG. 4 is parallelly executed for the second and third group of looms 2M, 3M, so that the second and third group of looms 2M, 3M are controlled in the same manner as the first group of looms 1M by the central control device 2. The above-mentioned flow or procedure of FIG. 4 may be successively executed for first, second and third groups of looms 1M, 2M, 3M in a predetermined order.

While starting of the loom has been shown and described as being accomplished upon outputting of the starting signal from the central control device 2 through the starting signal line 22 after completion of the preparation operation, it will be understood that starting of the loom may be automatically accomplished without outputting the starting signal from the central control device 2 after completion of the preparation operation.

Figure 5:
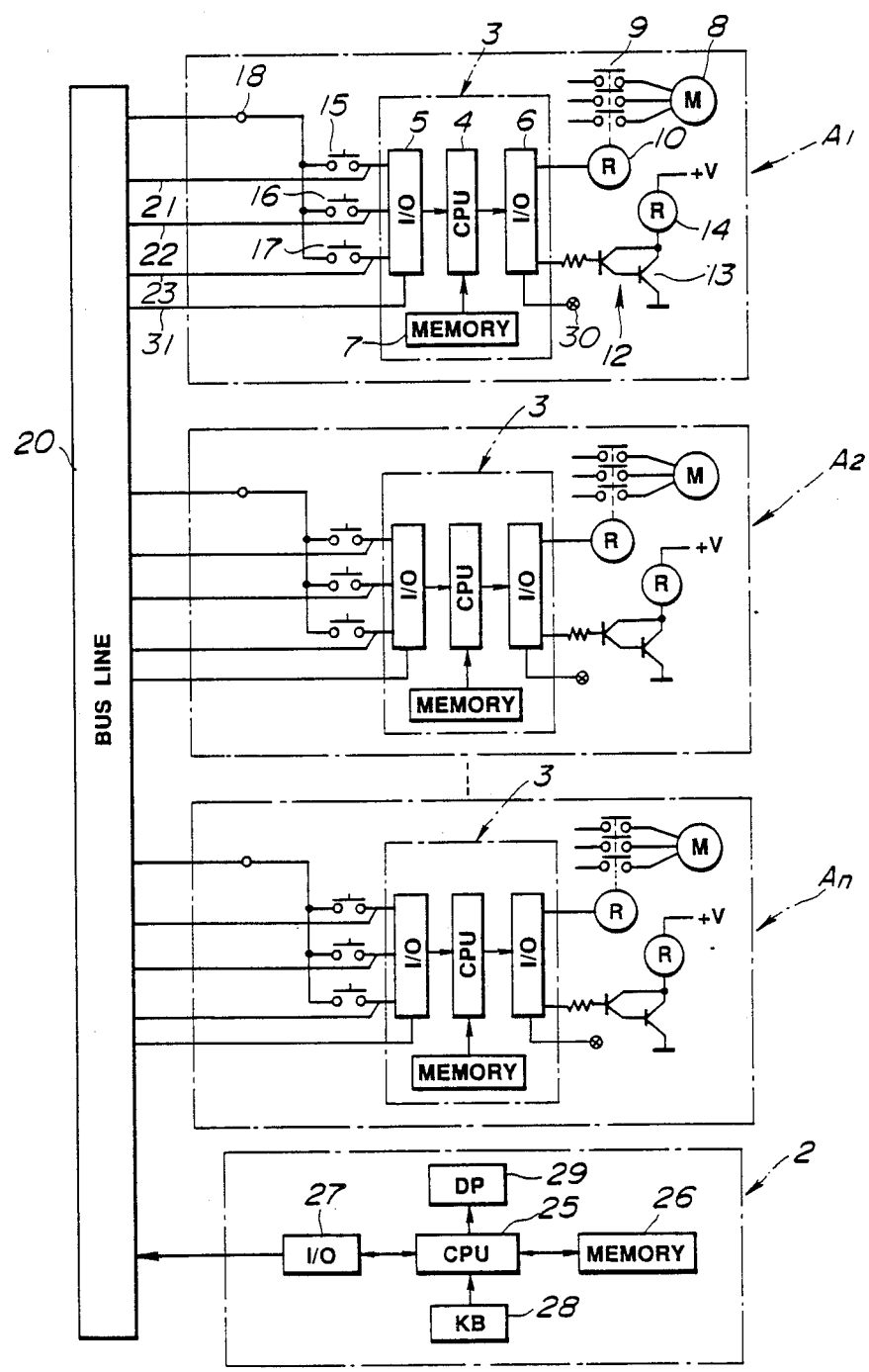
FIG. 5 is a circuit diagram of a second embodiment of the loom starting system by which a loom starting method of the present invention is accomplished.

FIG. 5 illustrates a second embodiment of the loom starting system and method according to the present invention, which is similar to the first embodiment of FIGS. 1 and 2 with the exception that a sensor 30 and a signal line 31 is added. In a flowchart of FIG. 6 showing the control of the looms in FIG. 5 by the central control device 2, the flow or procedure from start to the step of outputting through the preparation signal line is the same as that of FIG. 4 of the first embodiment. In this embodiment, the control circuit 3 of each loom is arranged to output a preparation completion signal indicative of completion of the preparation operation for the loom, in which the loom starting signal is output from the central control device 2 after the preparation completion signal is input to the central control device 2 of, for example, the loom $A_1$.

The operation of the loom starting system of this embodiment will be discussed more specifically with reference to the flowchart of FIG. 6. When the preparation signal from the central control device 2 is input the control circuit 3 of the loom $A_1$ to the heat cutter is operated to raise the temperature thereof as the preparation operation for the loom. When the temperature of the heat cutter reaches a predetermined level indicating completion of the preparation operation, the sensor 30 outputs the preparation completion signal which is transmitted through the signal line 31 and the bus line 20 to the central control device 2. Upon receiving this preparation completion signal, the central control device 2 outputs the loom starting signal to the control circuit 3 of the loom. If the preparation completion signal is not output even upon lapse of a predetermined time, the loom is stopped; and the flow or procedure up to the step of judging as to whether the preparation completion signal is output or not is repeated for the next loom $A_2$. The flow or procedure after the step of this judging is similar to that of FIG. 4 of the first embodiment.

What is claimed is:

1. A method of starting a group of looms each having a control circuit in electrical connection with a central control device, comprising the following steps:
   outputting operation command signals from the central control device respectively to control circuits of the looms in a predetermined order; and
   successively operating respective looms in response to respective operation command signals upon completing preparation for starting each loom.

2. A method of starting a group of looms as claimed in claim 1, wherein the step of operating includes the following steps:
   initiating preparation for starting a loom; and successively starting operation of respective looms in response to respective operation command signals upon completion of starting preparation.

3. A method of starting a group of looms as claimed in claim 1, wherein the step of operating includes the following steps:
   initiating preparation operation for starting a loom in response to a preparation signal;
   inputting a preparation completion signal to the central control device when preparation operation is completed; and
   outputting a starting signal from the central control device to a control circuit of each loom in response to the preparation completion signal.

4. A method of starting a group of looms each having a control circuit in electrical connection with a central control device, comprising the following steps:
   outputting a preparation signal from the central control device to the control circuit of each loom;
   initiating preparation operation for starting a loom in response to the preparation signal;
   inputting a preparation completion signal to the central control device when the preparation operation is completed; and
   outputting a starting signal from the central control device to the control circuit of each loom in response to the preparation completion signal, in accordance with a predetermined order.

5. A method of starting a group of looms each having a control circuit in electrical connection with a central control device, comprising the following steps:
   outputting operation command signals from the central control device respectively to control circuits of the looms in a predetermined order; and
   successively operating respective looms in response to respective operation command signals upon completing preparation for starting each loom, the successively operating step including initiating preparation for starting a loom, and successively starting operation of respective looms in response to respective operation command signals, upon completion of starting operation of each loom.

6. A method of starting a group of looms each having a control circuit in electrical connection with a central control device, comprising the following steps:
   programming in the central control device a starting procedure including a predetermined order according to which operations of respective looms are started;
   commencing execution of the starting procedure in the central control device; and
   successively outputting operation command signals in the predetermined order from the central control device to the loom control circuits in response to the commencing step, each operation command signal causing each loom to be started, upon completion of preparation for starting a loom.

7. A method of starting a group of looms each having a control circuit in electrical connection with a central control device, comprising the following steps:
   programming in the central control device a starting procedure including a predetermined order according to which operations of respective looms are successively started;
   commencing execution of the starting procedure in the central control device;
   successively outputting first operation command signals in the predetermined order from the central control device to the loom control circuits in response to the commencing step, each first operation command signal causing preparation of each loom to be performed; and
   successively outputting second operation command signals in the predetermined order from the central control device to the loom control circuits in response to the commencing step, after outputting the first operation command signals.

* * * * *